Figure 1:
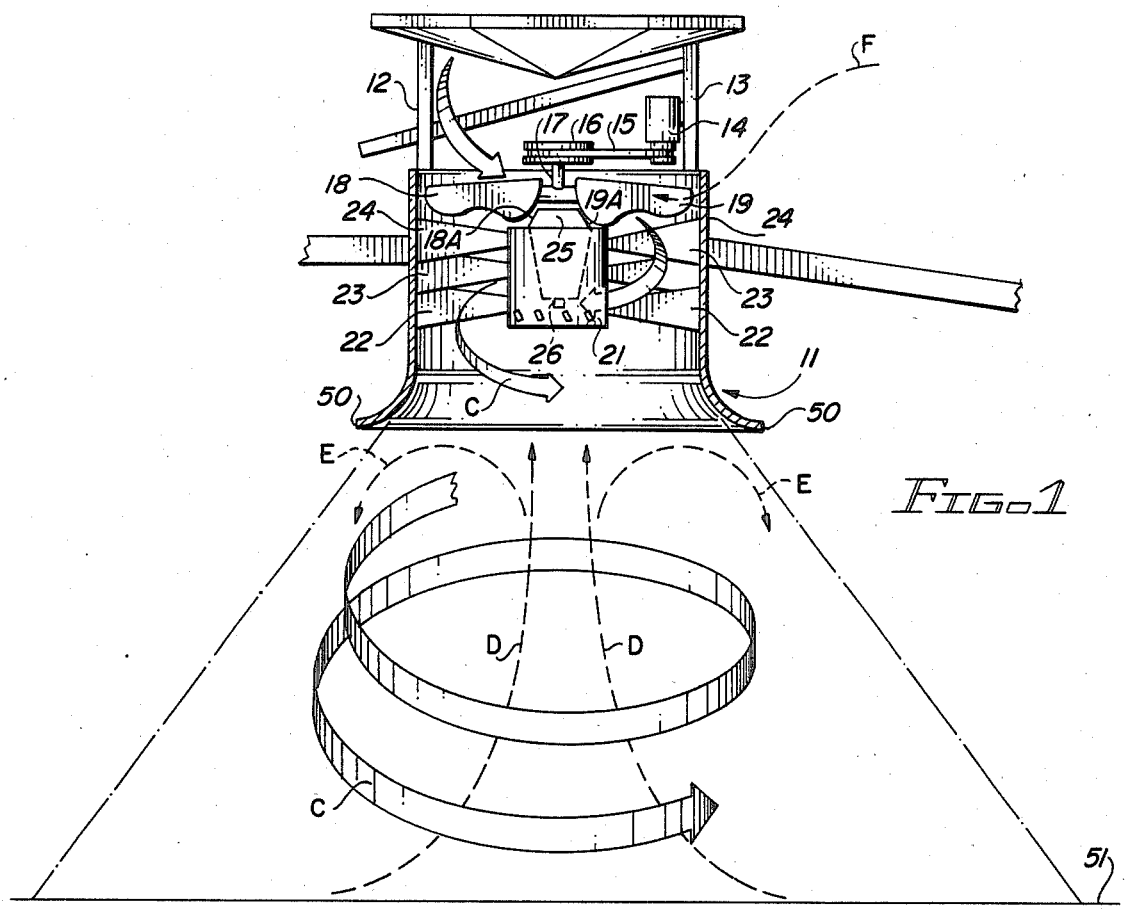
Figure 2:
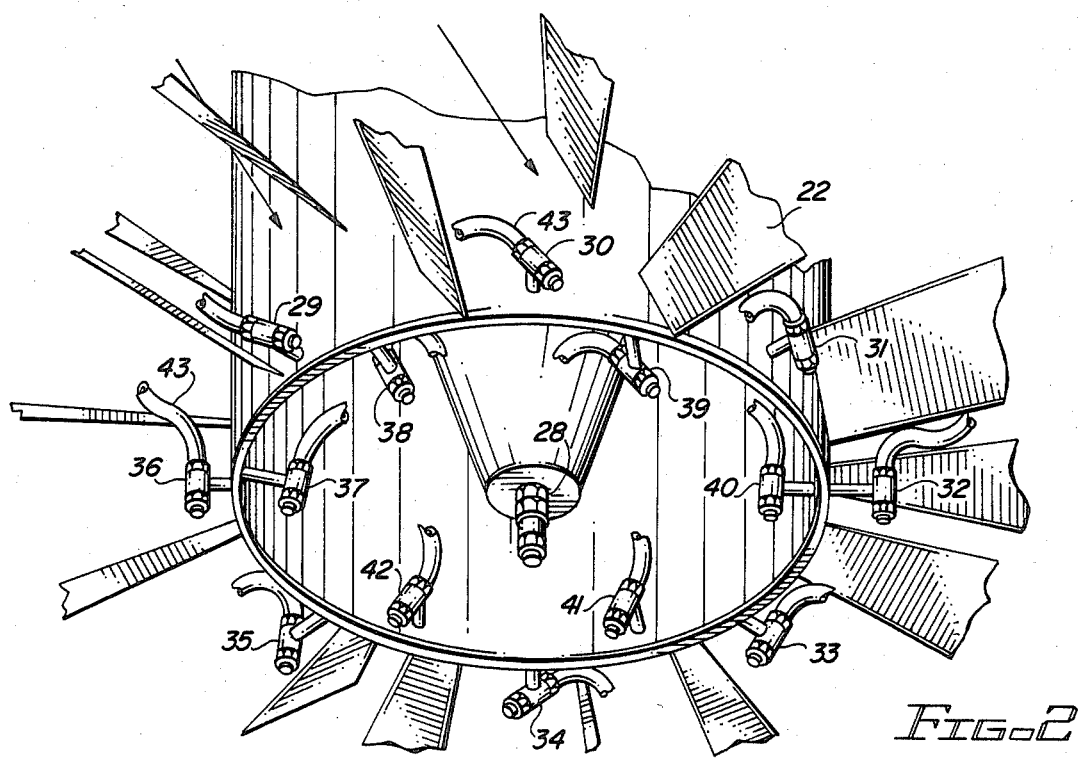

United States Patent [19]

Gordon

[11] Patent Number: 4,693,852

[45] Date of Patent: Sep. 15, 1987

[54] DROPLET INJECTION SYSTEM FOR EVAPORATIVE COOLING OF ANIMALS

[76] Inventor: Larry R. Gordon, 1612 E. First St., Mesa, Ariz. 85203

[21] Appl. No.: 926,524

[22] Filed: Nov. 4, 1986

[51] Int. Cl.[4] .................................................. B01F 3/04
[52] U.S. Cl. ..................................... 261/30; 261/79.2; 119/16; 119/21; 119/159
[58] Field of Search ................... 261/79.2, 30; 119/16, 119/21, 159

[56] References Cited

U.S. PATENT DOCUMENTS

| | | | |
|---|---|---|---|
| 3,761,065 | 9/1973 | Rich et al. | 261/79.2 |
| 3,811,278 | 5/1974 | Taylor et al. | 261/79.2 |
| 4,443,387 | 4/1984 | Gordon | 261/79.2 |
| 4,464,314 | 8/1984 | Surovikin et al. | 261/79.2 |
| 4,476,809 | 10/1984 | Bunger | 119/159 |
| 4,571,311 | 2/1986 | Ferguson, Jr. et al. | 261/79.2 |

FOREIGN PATENT DOCUMENTS

| | | | |
|---|---|---|---|
| 462744 | 7/1928 | Fed. Rep. of Germany | 261/79.2 |
| 1108666 | 6/1961 | Fed. Rep. of Germany | 261/79.2 |
| 683762 | 9/1979 | U.S.S.R. | 261/79.2 |

*Primary Examiner*—Tim Miles
*Attorney, Agent, or Firm*—Nissle & Leeds

[57] ABSTRACT

Improved evaporative cooling apparatus. The apparatus creates a cool microclimate at the skin and fur of an animal by directing a flow of evaporatively cooled air over the animal and by wetting the coat of the animal and directing a flow of air over the animal to evaporate water therefrom.

2 Claims, 5 Drawing Figures

DROPLET INJECTION SYSTEM FOR EVAPORATIVE COOLING OF ANIMALS

This invention relates to apparatus for uniformly evaporatively cooling a rotating mass of air which travels toward and contacts the ground, the apparatus evaporatively cooling the air mass with water droplets which are injected into the air mass and either remain suspended in the air mass or evaporate prior to the air mass's contacting the ground.

More particularly, the invention relates to evaporative cooling apparatus of the type described which, by producing a pair of concentric vortices each rotating in a common direction, greatly reduces or eliminates water induced degradation and corrosion of the apparatus.

In a further respect, the invention relates to evaporative cooling apparatus which, by varying the volume and droplet size of water injected into the air passing through the apparatus, permits ambient air to be continually cooled to a select temperature regardless of variations in the temperature of the ambient air.

In another respect, the invention relates to evaporative cooling apparatus which minimizes the development of turbulence and lateral shear air flow which occurs near the inner lower blade edges of the fan of the apparatus and tends to obstruct the uniform flow of air into and through the apparatus.

In still another respect, the invention relates to apparatus which creates a cool microclimate at the skin and fur of an animal by directing a flow of evaporatively cooled air over the animal and by wetting the surface of the animal and directing a flow of air over the animal to evaporate water therefrom.

Evaporative cooling apparatus of the type described in U.S. Pat. No. 4,443,387 to Gordon is well known in the art. However, such apparatus has several disadvantages which significantly adversely affect the efficiency of the apparatus in providing a uniformly cooled constant temperature atmosphere for dairy cows or other animals. During operation of the apparatus, water tends, at a relatively rapid rate, to collect on, corrode, and deteriorate the lower vanes, duct work and other structural components of the apparatus, increasing the "down time" required to maintenance the equipment. In addition, as the ambient temperature and humidity increase, the cooling provided by the apparatus is ordinarily incremented by increasing the water pressure to increase the volume of water dispensed by the nozzle. Increasing water pressure, while increasing the volume of water flowing from the nozzle, also tends to decrease the droplet size of water dispensed from the nozzle. On initial consideration, it would appear that increasing the volume of water and decreasing the water droplet size would, since smaller droplets are more readily evaporated, increase the cooling achieved by the apparatus and would therefore be desirable. However, as will be described, I have discovered that such conventional "high pressure-small droplet" systems are generally inflexible and, when the ambient temperature varies, do not enable a user to effectively maintain a generally stable temperature in the area cooled by such systems.

Accordingly, it would be highly desirable to provide an improved evaporative cooling apparatus which would minimize the deterioration and corrosion of the structure members comprising the apparatus and which would enable the temperature of air cooled by the apparatus to be maintained in a relatively narrow range during variation in the ambient air dry bulb temperature.

Therefore, it is a principal object of the invention to provide improved apparatus which downwardly directs a rotating mass of air toward the ground and evaporatively cools the air mass with droplets which are injected into the air mass and either remain suspended in the air or evaporate prior to the air mass's contacting the ground.

Another object of the invention is to provide improved cooling apparatus of the type described which cools a diary cow or other animal both by circulating evaporatively cooled air adjacent the animal and by wetting the surface hairs and/or skin of the animal and evaporating water from the animal by directing a stream of air over the animal.

A further object of the invention is to provide improved cooling apparatus of the type described in which reliance on cooling by evaporating water from the surface of the animal increases with increases in the ambient air temperature and humidity.

Still another object of the invention is to provide improved cooling apparatus of the type described which markedly reduces water induced degradation and corrosion of the apparatus.

Yet another another object of the invention is to provide improved cooling apparatus which permits ambient air to be cooled to a generally constant range during variation in the ambient air temperature.

These and other, further and more specific objects and advantages of the invention will be apparent to those skilled in the art from the following detailed description thereof, taken in conjuction with the drawings, in which:

FIG. 1 is a front section view illustrating evaporative cooling apparatus constructed in accordance with the principles of the invention;

FIG. 2 is a bottom perspective view of a portion of the evaporative cooling apparatus of FIG. 1 illustrating further construction details thereof;

FIG. 3 is a top perspective view of a portion of the evaporative cooling apparatus of FIG. 1 illustrating the air flow therethrough which produces concentric vortices rotating in a common direction of travel;

FIG. 4 is bottom perspective view of a portion of the evaporative cooling apparatus of FIG. 1, further illustrating interior construction details thereof; and, FIG. 5 is a schematic diagram illustrating a control system which can be utilized to monitor and operate evaporative cooling apparatus constructed in accordance with the invention.

Briefly, in accordance with my invention, I provide improved apparatus for directing a flow of air toward and over an animal to cool the animal. The apparatus comprises a frame; a hollow housing attached to the frame; a hollow member position inside and connected to the housing; means attached to the frame for directing an inner flow of air through the hollow member and an outer flow of air through the housing toward the animal; means for injecting water droplets into air directed into the apparatus by the air flow means; a plurality of spaced apart radially extending members intermediate the housing and hollow member to cause the outer flow of air to have an angular velocity and to move through the housing in a rotary direction of travel about an axis, the outer flow of air generally circulating about and defining an inner area; a plurality of spaced apart radially extending members inside the hollow member for causing the inner flow of air to have an angular velocity and move through the hollow member in a rotary direction of travel generally corresponding to the rotary direction of travel of the outer flow of air. The inner air flow generally prevents air from being drawn into the inner area away from the animal. The water droplet injecting means can include a first nozzle circuit including at least one nozzle positioned to inject first water droplets of generally uniform size into the air flowing through the apparatus such that the water droplets are generally uniformly distributed in the air; a second nozzle circuit including a plurality of spaced apart nozzles positioned to inject second water droplets of generally uniform size into air flowing through the apparatus such that the second water droplets are of larger size than the first water droplets and are generally uniformly distributed in the air; means for operating the first nozzle circuit to inject water droplets into air flowing through the apparatus when the air has a first selected dry bulb ambient temperature; means for operating the second nozzle circuit to inject water droplets into air flowing through the apparatus when the air has a second selected dry bulb ambient temperature greater than the first selected dry bulb ambient temperature. The difference between the first dry bulb temperature and the corresponding wet bulb temperature at the first dry bulb temperature is generally equal to or greater than the dry bulb temperature drop which would occur when the humidity of ambient air cooled by the water droplets from the first nozzle circuit was initially zero, and when the entire volume of water injected into a selected volume of air by the first nozzle circuit was completely evaporated in the volume of air. The difference between the second dry bulb temperature and the corresponding wet bulb temperature at the second dry bulb temperature is generally equal to or greater than the dry bulb temperature drop which would occur when the humidity of ambient air cooled by the water droplets from the second nozzle circuit was initially zero, and when the entire volume of water injected into a selected volume of air by the second nozzle circuit completely evaporated in the volume of air.

Turning now to the drawings which depict the presently preferred embodiments of the invention for the purpose of illustrating the practice thereof and not by way of limitation of the scope of the invention, and in which like reference characters refer to corresponding elements throughout the several views, FIGS. 1–4 illustrate evaporative cooling apparatus constructed in accordance with the principles of the invention and including a cylindrical housing 11 attached to frame members 12 and 13. Motor 14 attached to frame member 13 rotates belt 15 to turn pulley 16. Shaft 17 carries fan blades 18, 19 which rotate simultaneously with pulley 16. Shaft 17 is rotatably supported by a frame member (not shown) connected to member 13. Hollow member 21 is supported inside housing 11 by three tiers 22, 23, 24 of radially extending members. Truncated hollow conical housing 25 extends above hollow member 21 and is connected to opposing truncated conical member 26. Member 26 is supported inside member 21 by spaced apart radially extending vanes 27. Nozzle 28 is attached to the lower tapered end 26A of member 26. Nozzles 29–36 are attached to and are spaced outwardly away from member 21. Nozzles 37–42 are attached to and are spaced inwardly away from member 21. Conduit 43 delivers water to each nozzle 28–42, preferably at a pressure in the range of 150 to 400 psi. Nozzles 29, 31, 33, and 35 are TN 2 nozzles and each produce forty-five micron droplets at 300 psi. Nozzles 30, 32, 34, and 36 are TN 3 nozzles and each produce fifty-five micron droplets at 300 psi. Nozzles 37, 39 and 41 are TN 4 nozzles and each produce sixty-five micron droplets at 300 psi. Nozzles 38, 40, and 42 are TN 1 nozzles and each produce forty micron droplets at 300 psi. Nozzle 28 is a TN 6 nozzle produce ninety-five micron droplets at 300 psi.

Fan blades 18, 19 produce a downwardly directed flow of air which comes off the blades at an angle which is generally 45° to the verticle. Consequently, if one end of a string 70 is attached at point 73 to upper circular edge 74 of member 21, then when blades 18, 19 are rotating, the downward draft of air produced by the blades causes string 70 to move over inner cylindrical surface 72 of member 21 to a position at which the angle F (FIG. 3) between string 70 and vertical axis 71 is approximately 45°. As shown in FIG. 3, vanes 27 spanning the distance between member 21 and member 26 are arcuate and canted away from the vertical to cause air streams indicated by arrows A to flow between members 21 and 26 and to take on angular velocity and travel about the vertical collinear axes of members 21 and 26 in a rotary counter clockwise direction of travel. Vanes 27 cause air from blades 18, 19 to move in a more downward spiral direction of travel and, accordingly, tend to "tighten" the air spiral traveling through member 21 and to reduce the angle F between axis 71 and the direction of travel of air in the spiral passing through member 21. Similarly, as indicated by arrows B in FIG. 3, vanes 22–24 cause air flowing intermediate housing 11 and member 21 to take on angular velocity and travel about the vertical collinear axes of housing 11 and cylindical member 21 in a rotary counter clockwise direction of travel corresponding to the direction of travel of air A flowing between members 21 and 26. Vanes 22, 23 and 24 cause air from blades 18, 19 to move in a more horizontal spiral direction and, accordingly, tend to cause the air spiral traveling between housing 11 and member 21 to outwardly expand as indicated by arrows C and tend to increase the angle F between verticle axis 71 and the direction of travel or air in the spiral formed intermediate member 21 and housing 11.

In FIG. 1 arrows C indicates the downward expanding spiral path of travel generally followed by air B which is directed intermediate housing 11 and cylinder 21 by fan blades 18, 19. In the apparatus described in U.S. Pat. No. 4,443,387 to Gordon, an updraft, indicated by dashed line D in FIG. 1 herein, is created in the area generally circumscribed by air travelling in the downwardly expanding spiral path indicated by arrows C in FIG. 1. The updraft D deposits water droplets on the lower tier of vanes and ducting in the central portion of the housing 11 of the apparatus described in U.S. Pat. No. 4,443,387. These water droplets cause relatively rapid degradation and corrosion of such structural components. The apparatus of the invention solves this problem by causing a second more compact vortex to be formed in the area generally circumscribed by air travelling about member 21 in the path indicated by arrows C in FIG. 1. The compact inner vortex which spirals downwardly through member 21 in the area circumscribed by arrows C is, as earlier described, formed when air represented by arrows A in FIG. 3 flows intermediate cylindrical member 21 and conical member 26 and over vanes 27. This compact inner vortex causes updrafting air D to turn downwardly in the direction indicated by arrows E in FIG. 1, and generally prevents moisture from collecting on the lower tier of vanes and duct work.

Figure 3:
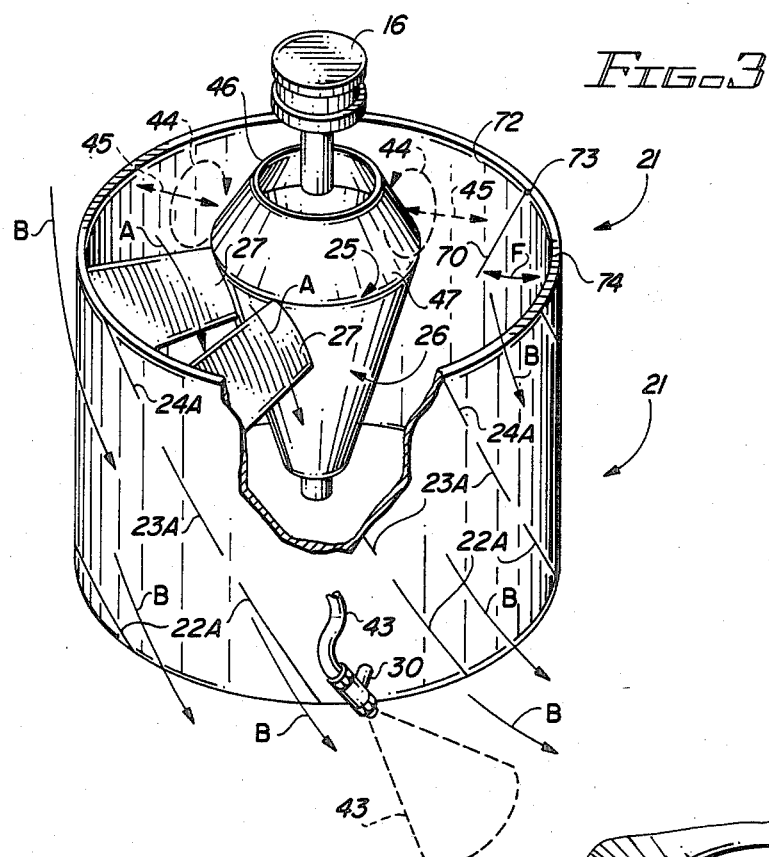
Figure 4:
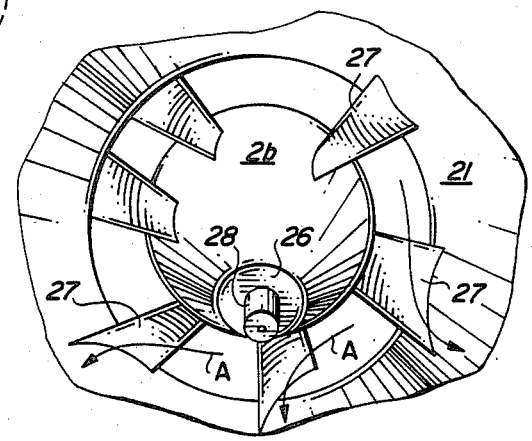

In FIG. 3 sloped lines 22A-24A indicate where vanes 22-24 are normally attached to cylindrical member 21 vanes 22-24 are omitted from FIG. 3 for the sake of clarity. The pump, pump motor and lengths of conduit supplying water to nozzles 28-42 have also been omitted from FIGS. 1-4 for the sake of clarity. Similarly the only nozzle shown in FIG. 3 is nozzle 30.

Water stream 43 from nozzle 30 in FIG. 3 travels in a direction generally parallel to the direction of travel of air streams B intermediate opposing vane pairs 22A-22A. Nozzles 29, 31-36 are positioned in a manner similar to that of nozzle 30 such that water droplets dispensed from nozzles 29, 31-36 travel a direction generally equivalent to that of air flowing downwardly past the nozzles. In a like manner nozzles 37-42 are canted such that water droplets dispensed from the nozzles generally travel in a direction equivalent to the direcion of air streams A flowing downwardly from between opposed spaced apart vane pairs 27.

During operation of the apparatus of FIG. 1 eddy currents and other turbulent air flow is generated near lower inner blade edges 18A, 19A when fan blades 18, 19 rotate. These eddy currents and lateral air flows are indicated by dashed lines 44 and 45 in FIG. 3. Prevailing wind, indicated by arrow F in FIG. 1, also causes the formation of eddy currents 44 and lateral air flows 45. Such turbulent air flow interferes with the desired downward laminar flow of air in the manner indicated by arrows A and B in FIGS. 3 and 4. Cowling 25 minimizes the adverse affect such turbulence has on the desired laminar flow of air through cylindrical member 21 and housing 11. Circular upper edge 46 is positioned above inner lower edges 18A, 19A. Inner edges 18A, 19A are generally adjacent the outer truncated conical surface of member 25 during rotation of shaft 17.

Conventional evaporative systems increase their cooling capacity by increasing water pressure to increase the volume of water dispensed from a nozzle utilized in the system, the increased water volume normally effecting a greater reduction in the dry bulb temperature of air passing through the system. The disadvantages of such an approach are that substantial amounts of electricity are required to power the pumps necessary to increase the pressure of water delivered to the nozzle, and, as the pressure increases, the size of water droplets dispensed by the nozzle decreases. In contrast, the apparatus of the invention permits ambient air to be continiously cooled to a selected temperature during variation in the temperature and humidity of the ambient air. As shown in Table I below, the apparatus of the invention continuously cools ambient air to a selected temperature by adjusting droplet size and volume while maintaing a relatively steady water pressure in excess of 150 psi, preferably in the range of 250-400 psi.

By maintaining a relatively steady pressure while adjusting volume and droplet size to alter the rate by which ambient air is cooled, the apparatus of the invention minimizes the amount of electricity required to operate the apparatus. Water for a bank of nine cooling units fo the type shown in FIG. 1 herein is provided by a pump powered by a four horsepower motor. The apparatus described in U.S. Pat. No. 4,443,387 to Gordon produces a volume of cooled air comparable to that produced by the apparatus of FIG. 1 herein; however, an eight horsepower pump is required to provide water to bank of nine cooling units of the type disclosed in U.S. Pat. No. 4,443,387 to Gordon.

The nozzles in each circuit 1-5 noted in Table I must each produce droplets of the same size, otherwise, air traveling through the apparatus of FIG. 1 is not uniformly cooled. If, for example, the apparatus was being operated in cooling stage 1 of Table I, and two of the nozzles in circuit 1 were TN 1 nozzles and the third nozzle was a Tn 2 nozzle, then the portion of the air receiving droplets from the TN 2 nozzle would be cooler than the air receiving droplets from the TN 1 nozzles and more importantly, would probably wet the floor of the area in which the animal is standing.

Each nozzle in a circuit of two or more nozzles must equidistant from other adjacent nozzles in the circuit, otherwise, air passing through the apparatus of FIG. 1 is not uniformly cooled. Each nozzle in a ring or circuit of nozzles is generally equidistant from center nozzle 28. As the distance of a circuit of nozzles from nozzle 28 increases; the number of nozzles in the circuit must be increased to insure that water is uniformly distributed in air passing through housing 11 and member 21. Table I refers to Nozzle Circuits 1-5. Nozzle Circuit 1 comprises nozzles 38, 40 and 42. Nozzle Circuit 2 comprises nozzles 29, 31, 33, and 35. Nozzle Circuit 3 comprises nozzles 30, 32, 24 and 36. Nozzle Circuit 4 comprises nozzles 37, 39 and 41. Nozzle Circuit 5 comprises nozzle 28. When one nozzle is a circuit is provided water through a supply conduit 43 then each other nozzle in the circuit is also provided water through a conduit 43. Each nozzle in a circuit is generally supplied with water under a pressure equal to that of water supplied the other nozzles in a circuit. Nozzles 28-42 presently have a spray angle at 300 psi of 65° to 85°, preferably 72°. Each Nozzle Circuit is preferably supplied with water under a pressure generally equivalent to that of water supplied to the other Nozzle Circuits.

In use, the apparatus of FIG. 1 is normally positioned such that lower lip 50 is approximately eight feet above the ground. Water injected into air passing through housing 11 is, by the time the air has traveled to within approximately one foot of the ground 51, completely evaporated or has evaporated sufficiently to remain airborne. Fan blades 18, 19 move approximately 20,000 to 21,000 cubic feet of air per minute through the apparatus. In FIG. 1, air spiralling along the path indicated by arrows C has, by the time it reaches ground 51, expanded to cover a circular area approximately twenty-five feet in diameter. The ambient dry and wet bulb temperatures are determined, and the ambient dry bulb temperature is utilized to select the corresponding estimated dry bulb temperature drop from Table I. This step and the following step can, as would be appreciated by those skilled in the art, readily be performed by manually reading thermometers or other sensors, or be performed using a microprocessor or electronic analog control unit, to read thermistors or other sensors and to control switch directing water to the appropriate nozzle circuits. If the estimated dry bulb temperature drop from Table I is equal to or less than the difference between the ambient dry and wet bulb temperatures, then activating the corresponding cooling circuit noted in Table I can produce more water than desired and wet the floor beneath the apparatus. Consequently, when the estimated dry bulb temperature drop in Table I for a particular ambient temperature is greater than the difference between the dry and wet bulb ambient temperature, a "lower" cooling stage is ordinarily selected. For example, if the ambient dry bulb temperature is 88° F. and the ambient wet bulb temperature is 78° F., then the difference between the wet and dry bulb ambient temperatures is less than the estimated dry bulb temperature drop of 13.56° F. in Table I. Accordingly, even though cooling stage 3 is designated in Table I for an ambient dry bulb temperature of 88° F., cooling stage 2 would be utilized because the estimated dry bulb temperature drop (9.9° F.) for cooling stage 2 is less than the difference (10° F.) between the wet and dry bulb ambient air temperatures.

Figure 5:
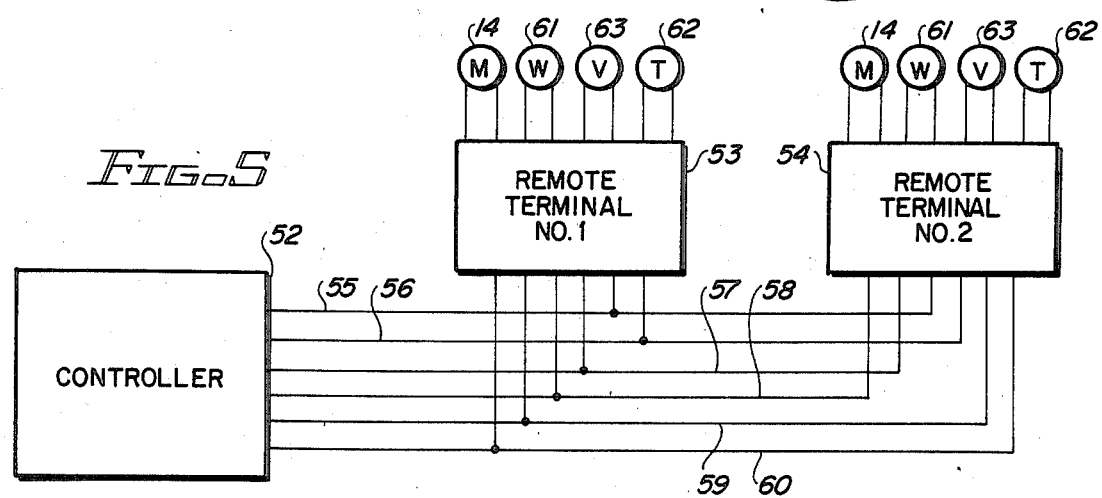

FIG. 5 illustrates a microprocessor or electronic analog system which can be utilized in the practice of the invention. The system includes a programmable controller 52, remote terminal units 53, 54, lines 55, 56 carrying DC current from controller 52 to terminals 53, 54, lines 57, 58 carrying binary "0" and "1" digital data from controller 52 to terminals 53, 54, and feed back lines 59, 60 carrying analog data from terminals 53, 54 to controller 52. DC voltage or "pulsed" DC voltage is transmitted to controller 52 over lines 59, 60. Controller 52 continuously monitors analog feedback lines 59, 60. An analog to digital convertor in controller 52 translates data received from lines 59, 60 to digital form. Each remote terminal 53, 54 includes means for generating output signals to activate a fan motor 14, a water pump 61, etc. Each remote terminal 53, 54 also includes input lines from selected sensing devices, such as thermistors 62 for determining wet and dry bulb temperatures, voltage sensors 63 for determining if fan motor 14 is operating, and sensors for determining which nozzles 28-42 are open and receiving pressurized water. These sensing devices presently typically include a switch which, when closed, produces a resistance value. For example, input lines to a terminal 43, 54 can be attached to the contacts of a fan motor. When there is no resistance, the motor is on; if there is resistance the motor is off. In operation of the system of FIG. 5, when controller 52 wishes to instruct a particular remote terminal 53 to produce certain output signals or to transmit along lines 59, 60 certain input signals received by terminal 53, controller 52 sends the digital address for terminal 53 over lines 55, 56 along with instructions concerning the output signals to be generated by terminal 53 or concerning the inputs to be transmitted to controller 52 over lines 59, 60. At any given instant, controller 52 only addresses and/or receives data from a single remote terminal 53,54. After controller 52 receives an analog input on lines 59,60, controller 52 ordinarily directs the terminal 53, 54 producing the input signal to turn off the input signal. An advantage of the control system of FIG. 5 is that it permits a great many remote terminals to be connected in parallel.

TABLE I
TEMPERATURE DROPS ACHIEVED FOR EACH COOLING STAGE

| COOLING STAGE | NOZZLE CIRCUIT(S) UTILIZED DURING COOLING STAGE | | | | | ESTIMATED DRY BULB TEMPERATURE DROP | APPROXIMATE AMBIENT DRY BULB TEMP. WHEN COOLING STAGE UTILIZED, °F. |
|---|---|---|---|---|---|---|---|
| | 1 | 2 | 3 | 4 | 5 | | |
| 1 | X | | | | | 3.65 | 80 |
| 2 | | X | | | | 9.9 | 85 |
| 3 | X | X | | | | 13.56 | 88 |
| 4 | | | X | | | 14.77 | 90 |
| 5 | X | | X | | | 18.42 | 93 |
| 6 | | X | X | | | 24.68 | 96 |
| 7 | X | X | X | | | 28.33 | 98 |
| 8 | X | X | | X | | 28.41 | 102 |
| 9 | X | | | X | X | 33.27 | 105 |
| 10 | | X | X | X | | 39.53 | 109 |
| 11 | X | X | X | X | | 43.18 | 112 |
| 12 | X | X | X | X | X | 50.58 | 115 |

NOTES

1. Nozzle Circuit 1 includes three (3) TN 1 nozzles which produce 40 micron droplets at 300 psi.
2. Nozzle Circuit 2 includes four (4) TN 2 nozzles which each produce 45 micron droplets at 300 psi.
3. Nozzle Circuit 3 includes four (4) TN 3 nozzles which each produce 55 micron droplets at 300 psi.
4. Nozzle Circuit 4 includes three (3) TN 4 nozzles which each produce 65 micron droplets at 300 psi.
5. Nozzle Circuit 5 includes one (1) TN 6 nozzle which produces 95 micron droplets at 300 psi.
6. As the ambient air temperature increases, the volume of water produced by the apparatus increases and the size of water droplets reaching the cow or other animal also increases.
7. The Estimated Dry Bulb Temperature Drop noted in the above table was calculated by determining the volume of water dispensed by the particular nozzle circuit per minute, determining the volume of air directed through the apparatus by the fan per minute, and determining the heat required to evaporate the water dispensed by the nozzle circuit. The heat required to evaporate the water was then used to estimate the amount by which the temperature of the air would be decreased when the air provided the heat to evaporate the water. The Estimated Dry Bulb Temperature Drop can be achieved only if the difference between the ambient air dry bulb temperature and the ambient air wet bulb temperature is equal to or greater than the Estimated Dry Bulb Temperature Drop. The body heat produced by a cow facilitates the evaporation of water droplets falling adjacent or against the cow.

During operation of the apparatus of FIGS. 1-4, at least a portion of the hair of fur of an animal standing underneath the apparatus is wetted or dampened so that the animal is cooled by evaporation of water from the cow. The apparatus of the invention creates a microclimate at the skin and fur of an animal which promotes the efficient cooling of the animal. To promote the formation of this circoclimate, it is the object of the invention to provide a cooling zone which, for dairy cows, extends from one foot above the ground to five feet above the ground and efficiently cools a dairy cow without wetting the ground by permitting droplets to travel from the apparatus directly to the ground or by permitting excess water to accumulate on the cow and drip from the cow to the ground.

Having described my invention in such terms as to enable those skilled in the art to which it pertains to understand and practice it, and having described the presently preferred embodiments thereof, I claim:

1. Apparatus for directing a flow of air toward and over an animal to cool the animal, said apparatus comprising
   a. a frame;
   b. a hollow housing attached to said frame;
   c. a hollow member positioned inside and connected to said housing;
   d. means attached to said frame for directing an inner flow of air through said hollow member and an outer flow of air through said housing toward said animal;
   e. means for injecting water droplets into air directed into said apparatus by said air flow means;
   f. a plurality of spaced apart radially extending members intermediate said housing and said hollow member for causing said outer flow of air to have an angular velocity and to move through said housing in a rotary direction of travel about an axis, said outer flow of air generally circulating about and defining an inner area;
   g. a plurality of spaced apart radially extending members inside said hollow member for causing said inner flow of air to have an angular velocity and move through said hollow member in a rotary direction of travel generally corresponding to said rotary direction of travel of said outer flow of air; and,
   h. said inner air flow generally preventing air from being drawn into said inner area away from said animal.

2. The apparatus of claim 1 wherein said water droplet injecting means includes
   a. a first nozzle circuit including at least one nozzle positioned to inject first water droplets of generally uniform size into air flowing through said apparatus such that said water droplets are generally uniformly distributed in said air;
   b. a second nozzle circuit including a plurality of spaced apart nozzles positioned to inject second water droplets of generally uniform size into air flowing through said apparatus such that said second water droplets are of larger size than said first water droplets and are generally uniformly distributed in said air;
   c. means for operating said first nozzle circuit to inject water droplets into air flowing through said apparatus when the air has a first selected dry bulb ambient temperature;
   d. means for operating said second nozzle circuit to inject water droplets into air flowing through said apparatus when the air has a second selected dry bulb ambient temperature greater than said first selected dry bulb ambient temperature;
   the difference between said first dry bulb temperature and the wet bulb temperature at said first dry bulb temperature generally being equal to or greater than the dry bulb temperature drop which would occur when
   e. the humidity of ambient air cooled by said water droplets from said first nozzle circuit was initially zero; and,
   f. the entire volume of water injected into a selected volume of air by said first nozzle circuit was completely evaporated in said volume of air;
   the difference between said second dry bulb temperature and the wet bulb temperature at said second dry bulb temperature generally being equal to or greater than the dry bulb temperature drop which would occur when
   g. the humidity of ambient air cooled by said water droplets from said second nozzle circuit was initially zero; and,
   h. the entire volume of water injected into a selected volume of air by said second nozzle circuit was completely evaporated in said volume of air.

* * * * *